United States Patent
Pisklak et al.

(10) Patent No.: US 11,932,806 B2
(45) Date of Patent: Mar. 19, 2024

(54) PASSIVATED CEMENT ACCELERATOR

(71) Applicant: Halliburton Energy Services, Inc., Houston, TX (US)

(72) Inventors: Thomas Jason Pisklak, Cypress, TX (US); Pauline Akinyi Otieno, Houston, TX (US); Kyriacos Agapiou, Houston, TX (US); Samuel Jason Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/738,450

(22) Filed: May 6, 2022

(65) Prior Publication Data

US 2022/0267663 A1 Aug. 25, 2022

Related U.S. Application Data

(63) Continuation of application No. 15/113,163, filed as application No. PCT/US2014/018910 on Feb. 27, 2014, now Pat. No. 11,352,543.

(51) Int. Cl.
*E21B 33/138* (2006.01)
*C04B 22/00* (2006.01)
(Continued)

(52) U.S. Cl.
CPC ............ *C09K 8/467* (2013.01); *C04B 22/00* (2013.01); *C04B 28/02* (2013.01); *C04B 28/04* (2013.01); *C04B 28/18* (2013.01); *C04B 28/34* (2013.01); *E21B 33/138* (2013.01); *C04B 2103/0036* (2013.01); *C04B 2103/10* (2013.01); *C04B 2103/12* (2013.01); *C04B 2103/20* (2013.01); *E21B 33/16* (2013.01); *E21B 36/003* (2013.01); *E21B 41/02* (2013.01); *E21B 43/14* (2013.01); *Y02P 40/10* (2015.11)

(58) Field of Classification Search
None
See application file for complete search history.

(56) References Cited

U.S. PATENT DOCUMENTS 1,976,132 A * 10/1934 Larmour ................. C04B 7/36
106/757
5,671,581 A 9/1997 Nagahama
(Continued)

FOREIGN PATENT DOCUMENTS

WO 2008068000 6/2008
WO 2010106308 9/2010

OTHER PUBLICATIONS

JP2005503983 Feb. 10, 2005 (Year: 2005).*
(Continued)

*Primary Examiner* — Charles R Nold
(74) *Attorney, Agent, or Firm* — Thomas Rooney; C. Tumey Law Group PLLC

(57) ABSTRACT

Embodiments relate to cementing operations and, in certain embodiments, to passivated cement accelerators and methods of using passivated cement accelerators in subterranean formations. An embodiment may comprise a method of cementing comprising: providing a cement composition comprising cement, water, and a passivated cement accelerator; and allowing the cement composition to set.

20 Claims, 2 Drawing Sheets

(51) Int. Cl.
- *C04B 28/02* (2006.01)
- *C04B 28/04* (2006.01)
- *C04B 28/18* (2006.01)
- *C04B 28/34* (2006.01)
- *C09K 8/467* (2006.01)
- *E21B 33/14* (2006.01)
- *C04B 103/00* (2006.01)
- *C04B 103/10* (2006.01)
- *C04B 103/12* (2006.01)
- *C04B 103/20* (2006.01)
- *E21B 33/16* (2006.01)
- *E21B 36/00* (2006.01)
- *E21B 41/02* (2006.01)
- *E21B 43/14* (2006.01)

(56) References Cited

U.S. PATENT DOCUMENTS

| | | | |
|---|---|---|---|
| 5,741,357 A * | 4/1998 | Sheikh | C04B 22/008 428/404 |
| 6,176,607 B1 | 1/2001 | Hajianpour | |
| 7,631,692 B2 | 12/2009 | Roddy et al. | |
| 8,557,036 B1 | 10/2013 | Chatterji et al. | |
| 8,899,329 B2 | 12/2014 | Chatterji et al. | |
| 2007/0235192 A1 | 10/2007 | Michaux et al. | |
| 2011/0118155 A1 | 5/2011 | Pisklak et al. | |
| 2011/0259246 A1 | 10/2011 | Guynn et al. | |
| 2012/0298011 A1* | 11/2012 | Silva | C04B 28/04 106/708 |
| 2013/0153222 A1 | 6/2013 | Pisklak et al. | |
| 2013/0233550 A1 | 9/2013 | Brothers et al. | |
| 2013/0248183 A1 | 9/2013 | Pisklak et al. | |
| 2013/0284069 A1 | 10/2013 | Dubey | |
| 2014/0000893 A1 | 1/2014 | Lewis et al. | |
| 2014/0020895 A1 | 1/2014 | Agapiou et al. | |
| 2014/0034313 A1 | 2/2014 | Pisklak et al. | |
| 2014/0034314 A1 | 2/2014 | Lewis et al. | |
| 2014/0048267 A1 | 2/2014 | Pisklak et al. | |
| 2014/0083701 A1 | 3/2014 | Boul et al. | |
| 2014/0090843 A1 | 4/2014 | Boul et al. | |
| 2014/0174741 A1 | 6/2014 | Agapiou et al. | |
| 2014/0190696 A1 | 7/2014 | Iverson et al. | |
| 2014/0202698 A1 | 7/2014 | Pisklak et al. | |
| 2014/0216746 A1 | 8/2014 | Ballew et al. | |
| 2014/0373756 A1 | 12/2014 | Brothers et al. | |
| 2014/0374098 A1 | 12/2014 | Brothers et al. | |
| 2015/0107494 A1 | 4/2015 | Al-Yami et al. | |
| 2015/0175481 A1 | 6/2015 | Pisklak et al. | |
| 2015/0175869 A1 | 6/2015 | Agapiou et al. | |
| 2015/0197033 A1 | 7/2015 | Agapiou et al. | |
| 2015/0197453 A1 | 7/2015 | Pisklak et al. | |
| 2015/0315875 A1 | 11/2015 | Chatterji et al. | |
| 2015/0322327 A1 | 11/2015 | Chatterji et al. | |
| 2016/0075933 A1 | 3/2016 | Pisklak et al. | |
| 2016/0084037 A1 | 3/2016 | Brothers et al. | |
| 2016/0137902 A1 | 5/2016 | Pisklak et al. | |
| 2016/0186036 A1 | 6/2016 | Pisklak et al. | |
| 2016/0194545 A1 | 7/2016 | Pisklak et al. | |

OTHER PUBLICATIONS

International Search Report and Written Opinion for International Application No. PCT/US2014/018910 dated Nov. 17, 2014.

Early hydration and setting of oil well cement, Cement Concrete Research 2010, vol. 40, No. 7, Jie Zhang et al.

Study on the preparation and performance of a new alkali-free and chloride-free liquid accelerator. In Materials Science Forum, 2013, Vild 743-744. Zhongcheng Ma et al.

Effect of non-chloride hardening accelerator and type of curing on the compressive strength of pavement concrete produced with slag cement. International journal of multidisciplinary research. 2012. vol. 2. No. 3. Vilas V. Karjinni et al.

Japanese Office Action for Japanese Application No. 2016-560614 dated Jul. 11, 2017.

Enmese Office Action for Application No. CN 163422 dated Jul. 21, 2018.

Notice of Allowance for U.S. Appl. No. 15/113,163 dated Mar. 8, 2022.

Office Action Summary for U.S. Appl. No. 15/113,163 dated Dec. 1, 2017.

Office Action Summary for U.S. Appl. No. 15/113,163 dated Nov. 19, 2018.

Office Action Summary for U.S. Appl. No. 15/113,163 dated Oct. 31, 2019.

Final Office Action Summary for U.S. Appl. No. 15/113,163 dated May 13, 2019.

Final Office Action Summary for U.S. Appl. No. 15/113,163 dated Apr. 30, 2020.

* cited by examiner

PASSIVATED CEMENT ACCELERATOR

BACKGROUND

Embodiments relate to cementing operations and, in certain embodiments, to passivated cement accelerators and methods of using passivated cement accelerators in subterranean formations.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, a cement accelerator may be used to accelerate strength development of the cement. For example, a cement accelerator may be added to a cement composition to provide appreciable strength to the cement composition in the early stages of strength development (e.g., within 24 hours at temperatures below 160° F.). Among other reasons, a cement accelerator may be suitable for use in wellbore applications, for example, where it is desired to reduce the length of an operation (e.g., by reducing the period of hydration). Cement accelerators may also be suitable to counter the retarding effects of low temperature, such as in operations near the surface, or in systems where additives that may retard the cement have been used.

While cement accelerators have been developed heretofore, challenges exist with their successful use in subterranean cementing operations. For example, cement accelerators may have undesired gelation issues which can limit their use and effectiveness in cementing operations. These issues may persist even with the presence of dispersants. Further, some cement accelerators may induce flash setting. Flash setting can make the cement difficult to place, can damage the formation, and may lead to operational delays and an increase in operational costs. Traditional cement accelerators that have been developed, for example, those comprising $CaCl_2$, may be effective in some operations but may have limited use in some types of cements or in cements that have been retarded with some types of additives. For example, $CaCl_2$ is typically not useable at temperatures as low as 40° F., furthermore $CaCl_2$ has been known to corrode wellbore equipment and thus increase costs as well as the risk of formation damage.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
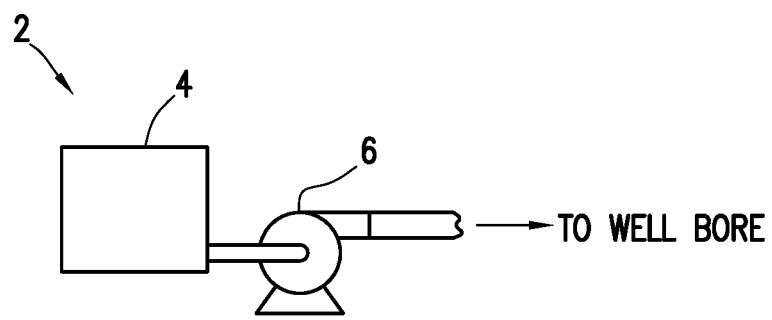
FIG. 1 illustrates a system for preparation and delivery of a cement composition to a wellbore in accordance with certain embodiments.

Embodiments relate to cementing operations and, in certain embodiments, to passivated cement accelerators and methods of using passivated cement accelerators in subterranean formations. Cement compositions comprising passivated cement accelerators may be used in a variety of cementing operations including surface cementing operations (e.g., construction) and subterranean cementing operations (e.g., primary and remedial cementing). One of the many potential advantages to these methods and compositions is that they may increase early strength development, but not induce or contribute to gelation or flash setting. Additionally, the methods and compositions herein provide a low cost, logistical means of accelerating early strength development as well as adding compressive strength to a cement composition, whereas typical accelerators merely accelerate the strength development of the cement.

An example cement composition may comprise cement and water. Optionally, the cement composition may further comprise lime, dispersant, and/or a set retarder. As discussed in more detail below, a passivated cement accelerator may be used, for example, to increase the early strength development of the cement composition. The cement compositions may be suitable for a number of subterranean cementing operations, including subterranean formations having relatively low temperatures, e.g., temperatures ranging from about 40° F. or lower to about 200° F.; and in subterranean formations having temperatures up to about 500° F. or higher. In particular embodiments, the cement compositions may be used in subterranean formations having a temperature range of about 40° F. to about 240° F.

The cement composition may comprise cement. Any of a variety of cements may be suitable including those comprising calcium, aluminum, silicon, oxygen, iron, and/or sulfur, which set and harden by reaction with water. Specific examples of cements that may be suitable include, but are not limited to, Portland cements, pozzolana cements, gypsum cements, high alumina content cements, silica cements, slag cements, and any combination thereof. Examples of suitable Portland cements may include those classified as Classes A, B, C, G, or H cements according to American Petroleum Institute, *API Specification for Materials and Testing for Well Cements*, API Specification 10, Fifth Ed., Jul. 1, 1990. Additional examples of suitable Portland cements may include those classified as ASTM Type I, II, III, IV, or V.

Embodiments of the cement may comprise pumice, a pozzolana cementitious material. Generally, pumice is a volcanic rock that can exhibit cementitious properties in that it may set and harden in the presence of hydrated lime and water. The pumice may also be ground. Generally, the pumice may have any particle size distribution as desired for a particular application. In certain embodiments, the pumice may have a d50 particle size distribution in a range of from about 1 micron to about 200 microns. The d50 values may be measured by particle size analyzers such as those manufactured by Malvern Instruments, Worcestershire, United Kingdom. In specific embodiments, the pumice may have a d50 particle size distribution in a range of from about 1 micron to about 200 microns, from about 5 microns to about 100 microns, or from about 10 microns to about 25 microns. In one particular embodiment, the pumice may have a d50 particle size distribution of about 15 microns or less. An example of a suitable pumice is DS-325 lightweight aggregate available from Hess Pumice Products, Inc., Malad, Idaho, and has a d50 particle size distribution of about 15 microns or less. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Embodiments of the cement may comprise slag. Slag is generally a granulated, blast furnace by-product from the production of cast iron comprising the oxidized impurities found in iron ore. The slag may be included in embodiments of the hydraulic cement in an amount suitable for a particular application.

Embodiments of the cement may comprise fly ash, a pozzolana cementitious material. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions is necessary for a cement composition comprising Class F fly ash. In some embodiments, lime may be mixed with Class F fly ash in an amount in the range of about 0.1% to about 100% by weight of the fly ash. In some instances, the lime may be hydrated lime. Suitable examples of fly ash include, but are not limited to, POZ-MIX® A cement additive, available from Halliburton Energy Services, Inc., Houston, Texas.

Embodiments of the cement may comprise a high alumina content cement. In some embodiments, a high alumina cement comprises a calcium aluminate. The calcium aluminate may be any calcium aluminate suitable for use as a cement. A suitable calcium aluminate is SECAR® 60 calcium aluminate, available from Lonestar Lafarge Company. The high alumina content cement may further comprise a soluble phosphate. Among other things, it is believed that the soluble phosphate should react with the high alumina content cement to form a set cement that may be resistant to carbon dioxide. For example, calcium aluminate should react with sodium polyphosphate to form a calcium phosphate cement. Any type of soluble phosphate may be included in the high alumina content cement, examples include but are not limited to, vitreous sodium phosphates, sodium hexametaphosphates, sodium polyphosphates, sodium dihydrogen phosphates, sodium monohydrogen phosphates, and combinations thereof. Other soluble alkali phosphates also may be suitable for use. A suitable soluble phosphate is available from Astaris LLC, St. Louis, Mo.

The cement may be included in the cement compositions in an amount suitable for a particular application. The concentration of the cement may also be selected, for example, to provide a particular compressive strength for the cement composition after setting. Where used, the cement may be included in an amount in a range of from about 1% to about 99% by weight of the cement. By way of example, the cement may be present in an amount ranging between any of and/or including any of about 1%, about 5%, about 10%, about 20%, about 30%, about 40%, about 50%, about 60%, about 70%, about 80%, about 90%, or about 99% by weight of the cement. In one particular embodiment, the cement may be present in an amount in a range of from about 25% to about 75% by weight of the cement and, alternatively, from about 40% to 60% by weight of the cement. In some embodiments, the cementitious components present in the cement composition may consist essentially of the cement. For example, the cement composition may primarily comprise cement and water without any additional components that hydraulically set in the presence of water. One of ordinary skill in the art, with the benefit of this disclosure, should recognize the appropriate amount of cement to include for a chosen application.

The water used in embodiments of the cement compositions may be from any source provided that it does not contain an excess of compounds that may undesirably affect other components in the cement compositions. For example, a cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the cement composition in an amount in the range of from about 33% to about 200% by weight of the cement. In certain embodiments, the water may be present in the cement compositions in an amount in the range of from about 35% to about 70% by weight of the cement. One of ordinary skill in the art with the benefit of this disclosure will recognize the appropriate amount of water for a chosen application.

Embodiments of the cement compositions may comprise a calcium ion source. Suitable calcium ion sources may comprise any compound such as a calcium-containing salt or other species that is capable of dissociation to give calcium ions. In some embodiments, the calcium ion source may be capable of reacting with any other constituent of the cement composition as to form a cementitious material. For example, suitable calcium ion sources may be capable of reacting with pumice in the presence of water so as to form a cementitious material. Examples of calcium ion sources include: hydrated lime (which may alternatively be referred to as e.g., calcium hydroxide, slaked lime, builder's lime, and/or slack lime); quick lime (which may alternatively be referred to as e.g., calcium oxide); and calcium salts in the presence of a hydroxide ion source. Calcium salts according to some embodiments may be of the form $CaX_2$, where X is an anion with a formal charge of $-1$ (e.g., $CaBr_2$, $CaF_2$, $CaI_2$, $CaCl_2$). Calcium salts according to other embodiments may be of the form CaX, where X is an anion with a formal charge of $-2$ (e.g., carbonate anion $CO_3^{-2}$). In some embodiments, a calcium ion source may be accompanied by or otherwise combined with a hydroxide ion source in the cement composition. Such a source may include a hydroxide salt of an alkali or alkaline earth element. Suitable hydroxide salts include sodium hydroxide, potassium hydroxide, and calcium hydroxide. In certain embodiments, the calcium ion source may be included in a cement composition and subjected to alkaline conditions (for example, in order to support a pozzolanic reaction between the calcium ion source and the pozzolan of some cement compositions). In some embodiments, the calcium ion source itself may be alkaline or may, upon disassociation, create alkaline conditions (e.g., such as would occur upon the dissociation of calcium hydroxide).

Where present, the calcium ion source may be included in the cement compositions in an amount in the range of from about 10% to about 100% by weight of the cement, for example. In some embodiments, the calcium ion source may be present in an amount ranging between any of and/or including any of about 10%, about 20%, about 40%, about 60%, about 80%, or about 100% by weight of the cement. One of ordinary skill in the art, with the benefit of this disclosure, will recognize the appropriate amount of the calcium ion source to include for a chosen application.

Embodiments of the cement compositions may comprise a set retarder, for example, to delay the setting and/or retard the cement. A broad variety of set retarders may be suitable for use in the cement compositions. For example, the set retarder may comprise phosphonic acids, such as amino tris(methylene phosphonic acid), ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the cement compositions in an amount sufficient to delay the setting for a desired time. In some embodiments, the set retarder may be present in the cement compositions in an amount in the range of from about 0.01% to about 10% by weight of the cement. In specific embodiments, the set retarder may be present in an amount ranging between any of and/or including any of about 0.01%, about 0.1%, about 1%, about 2%, about 4%, about 6%, about 8%, or about 10% by weight of the cement. An example embodiment of a cement composition may comprise pumice, hydrated lime, water, and a set retarder. One of ordinary skill in the art, with the benefit of this disclosure, will recognize the appropriate amount of the set retarder to include for a chosen application.

As previously mentioned, embodiments of the cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pennsylvania Other suitable dispersants may be polycarboxylated ether dispersants such as Liquiment® 5581F and Liquiment® 514 L dispersants available from BASF Corporation Houston, Texas; or Ethacryl™ G dispersant available from Coatex, Genay, France. An additional example of a suitable available dispersant is CFR™-3 dispersant, available from Halliburton Energy Services, Inc, Houston, Texas. The Liquiment® 514 L dispersant may comprise 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of a set-delayed or retarded cement composition. For example, it is believed that the polycarboxylated ether dispersants may react with certain set retarders (e.g., phosphonic acid derivatives) resulting in formation of a gel that suspends the cementitious materials in the composition for an extended period of time.

In some embodiments, the dispersant may be included in the cement compositions in an amount in the range of from about 0.01% to about 5% by weight of the cement. In specific embodiments, the dispersant may be present in an amount ranging between any of and/or including any of about 0.01%, about 0.1%, about 0.5%, about 1%, about 2%, about 3%, about 4%, or about 5% by weight of the cement. One of ordinary skill in the art, with the benefit of this disclosure, will recognize the appropriate amount of the dispersant to include for a chosen application.

In some embodiments, a viscosifier may be included in the cement compositions. The viscosifier may be included to optimize fluid rheology and to stabilize the suspension. Without limitation, examples of viscosifiers include swellable clays such as bentonite or biopolymers such as cellulose derivatives (e.g., hydroxyethyl cellulose, carboxymethyl cellulose, carboxymethyl hydroxyethyl cellulose). An example of a commercially available viscosifier is SA-1015™ available from Halliburton Energy Services, Inc., Houston, TX. The viscosifier may be included in the cement compositions in an amount in the range of from about 0.01% to about 0.5% by weight of the cement. In specific embodiments, the viscosifier may be present in an amount ranging between any of and/or including any of about 0.01%, about 0.05%, about 0.1%, about 0.2%, about 0.3%, about 0.4%, or about 0.5% by weight of the cement. One of ordinary skill in the art, with the benefit of this disclosure, will recognize the appropriate amount of viscosifier to include for a chosen application.

Other additives suitable for use in the cementing operations may also be added to the cement compositions as desired for a particular application. Examples of such additives include, but are not limited to, foaming additives, strength-retrogression additives, lightweight additives, gas-generating additives, mechanical-property-enhancing additives, lost-circulation materials, fluid-loss-control additives, defoaming additives, thixotropic additives, and any combination thereof. Specific examples of these, and other, additives include crystalline silica, fumed silica, silicates, salts, fibers, hydratable clays, microspheres, diatomaceous earth, natural pozzolan, zeolite, fly ash, rice hull ash, swellable elastomers, resins, any combination thereof, and the like. A person having ordinary skill in the art, with the benefit of this disclosure, will readily be able to determine the type and amount of additive useful for a particular application and desired result.

Optionally, foaming additives may be included in the cement compositions to, for example, facilitate foaming and/or stabilize the resultant foam formed therewith. In particular, the cement compositions may be foamed with a foaming additive and a gas. The foaming additive may include a surfactant or combination of surfactants that reduce the surface tension of the water. By way of example, the foaming agent may comprise an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Inc.

Optionally, strength-retrogression additives may be included in the cement compositions to, for example, prevent the retrogression of strength after the cement composition has been allowed to develop compressive strength when the cement composition is exposed to high temperatures. These additives may allow the cement compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Optionally, lightweight additives may be included in the cement compositions to, for example, decrease the density of the cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Optionally, gas-generating additives may be included in the cement compositions to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Optionally, mechanical-property-enhancing additives may be included in the cement compositions to, for example, ensure adequate compressive strength and long-term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, latexes, and combinations thereof.

Optionally, lost-circulation materials may be included in the cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, ground marble, wood, nut hulls, formica, corncobs, cotton hulls, and combinations thereof.

Optionally, fluid-loss-control additives may be included in the cement compositions to, for example, decrease the volume of fluid that is lost to the subterranean formation. Properties of the cement compositions may be significantly influenced by their water content. The loss of fluid can subject the cement compositions to degradation or complete failure of design properties. Examples of suitable fluid-loss-control additives include, but are not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Optionally, defoaming additives may be included in the cement compositions to, for example, reduce tendency for the cement composition to foam during mixing and pumping of the cement compositions. Examples of suitable defoaming additives include, but are not limited to, polyol silicone compounds. Suitable defoaming additives are available from Halliburton Energy Services, Inc., under the product name D-AIR™ defoamers.

Optionally, thixotropic additives may be included in the cement compositions to, for example, provide a cement composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The components of the cement compositions may be combined in any order desired to form a cement composition that can be placed on a surface and/or into a subterranean formation. In addition, the components of the cement compositions may be combined using any mixing device compatible with the composition, including a bulk mixer, for example. In one particular example, a cement composition may be prepared by combining the dry components (which may be the cement component, for example) with water. Liquid additives (if any) may be combined with the water before the water is combined with the dry components. The dry components may be dry blended prior to their combination with the water. For example, a dry blend may be prepared that comprises the magnesium metal ore waste and the cement component. Other suitable techniques may be used for preparation of the cement compositions as will be appreciated by those of ordinary skill in the art in accordance with example embodiments.

Those of ordinary skill in the art will appreciate that embodiments of the cement compositions generally should have a density suitable for a particular application. By way of example, the cement compositions may have a density in the range of from about 4 pounds per gallon ("lb/gal") to about 20 lb/gal. In certain embodiments, the cement compositions may have a density in the range of from about 8 lb/gal to about 17 lb/gal. Embodiments of the cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

Embodiments of the cement compositions may be set-delayed in that they remain in a pumpable fluid state for one day or longer (e.g., about 1 day, about 2 weeks, about 2 years or more) at room temperature (e.g., about 80° F.) in quiescent storage. For example, the set-delayed cement compositions may remain in a pumpable fluid state for a period of time from about 1 day to about 7 days or more. In some embodiments, the set-delayed cement compositions may remain in a pumpable fluid state for about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005. An example embodiment of a cement composition that has been set-delayed may comprise pumice, hydrated lime, water, a set retarder, and optionally a dispersant.

Embodiments may generally utilize a passivated cement accelerator to increase early strength development. As used herein, a passivated cement accelerator refers to particles of a cementitious material that have undergone hydration while diluted in water such that they did not agglomerate and set into a hardened mass. Without being limited by theory, it is believed that the passivated cement accelerator may generally be described as having a passivating layer of a hydration reaction product (e.g., a passivating layer of calcium-silicate-hydrate for Portland cements) that encapsulates the particles of a cementitious material such that the cores of such particles are less available for diffusion due to their encapsulation by the passivating layer, which may create a semi- or completely impermeable barrier until the passivating layer is at least partially removed by placing the passivated particles into alkali conditions. Further, the passivation process isolates the particles of the cementitious material such that they do not form an interlocking connected network that may set into a hardened mass, but reside instead as either discrete particles or as a localized loosely connected network of a small number of particles (e.g., two, three, four particles, etc.) that possess only a limited connectivity that may be broken if additional agitation is applied. In embodiments, the passivated cement accelerator may generally be prepared by mixing cementitious materials with an abundance of water while stirring the mixture at a sufficient rate and for a sufficient time such that the cementitious material and water are allowed to react, yet the particles of the cementitious material are kept separate from one another, such that they do not form a hardened mass. The amount of water to add and the amount of stirring or agitation required depends on the type of cementitious material to be passivated. Generally, the minimum amount of water required is the amount necessary to keep the particles from agglomerating; this amount may vary depending on the amount of agitation to be applied. Likewise, the minimum amount of agitation required is the amount necessary to keep the particles from settling; this amount may vary depending on the amount of water that has been added.

Table 1 below shows an X-ray diffraction ("XRD") compositional analysis of a passivated cement accelerator that may be used in accordance with example embodiments contrasted with an unhydrated Portland cement. The passivated cement accelerator shown in Table 1 is a passivated Portland cement prepared in accordance with the procedure described below in Example 4 and aged to 127 days.

TABLE 1

XRD of a Passivated Cement Accelerator

| Name | Structure | Unhydrated Portland Cement | Passivated Cement Accelerator |
|---|---|---|---|
| Hatrurite | $(C_3S)$ | 54% | 5% |
| Larnite | $(C_2S)$ | 26% | 2% |
| Brownmillerite | $(C_4AF)$ | 17% | 7% |
| Gypsum | $CaSO_4 \cdot 2H_2O$ | 3% | — |
| Portlandite | $Ca(OH)_2$ | — | 15% |
| Ettringite | $Ca_6Al_2(SO_4)_3(OH_{12}) \cdot 24 H_2O$ | — | 10% |
| Amorphous | non-crystalline | — | 61% |
| Periclase | MgO | — | — |
| Anhydrite | $CaSO_4$ | — | — |

As illustrated in the table above, this example embodiment of a passivated cement accelerator may comprise $C_3S$ in an amount of about 50% or less, $C_2S$ in an amount of about 20% or less, and $C_4AF$ in an amount of about 15% or less. In contrast, a typical unhydrated Portland cement would be expected to comprise $C_3S$ in an amount of about 54%, $C_2S$ in an amount of about 26%, and $C_4AF$ in about 17%. As can be seen in Table 1, the passivation process may convert the cementitious material from a fully crystalline material to a material which is comprised partially of crystalline phases and partially of amorphous phases. Even after the passivated cement had been in contact with water for 127 days there is still evidence of un-hydrated crystalline material, which is present at ~14% of the composition. Without being limited by theory, the presence of un-hydrated crystalline material may be explained by the passivation process. Ideally, during the passivation process, the amorphous phases form a barrier of low diffusivity around the crystalline cement particle (e.g., in Portland cement, the amorphous barrier may be composed of the Portland cement reaction product calcium-silicate-hydrate "CSH"). This barrier prevents the total hydration of the cement particle and provides a mechanism by which the passivated cement accelerator becomes active when introduced to cementitious slurries. Without being limited by theory, it is believed that the mechanism through which the passivated cement accelerator works is that when the accelerator is introduced to an alkaline cementitious slurry, the amorphous layer dissolves, or partially dissolves, and the remaining crystalline cementitious material is hydrated. The hydration of the crystalline cementitious material and the inherent reactivity of the dissolved amorphous phases provide a significant acceleration to the cementitious reactions taking place in the alkaline cementitious slurry.

Any cementitious material discussed herein may be passivated. For example, the passivated cement accelerator may comprise Portland cements, pozzolana cements, gypsum cements, high alumina content cements, silica cements, slag cements, and any combination thereof. As an example and without being limited by theory, it is believed that a Portland cement that has been passivated will comprise Portland cement particles that are surrounded by a passivating layer of calcium-silicate-hydrate (CHS) gel. In this example, the passivated Portland cement may not form a hardened mass until it is placed in alkaline conditions such that the alkalinity may remove at least a portion of the passivating layer.

Preparing the passivated cement accelerator comprises the addition of a cementitious material to water. An abundance of water should be used such that the particles of the cementitious material are not capable of agglomerating, for example the water may be used in an amount of about 60% by weight of the cementitious material to about 500% by weight of the cementitious material or more. The amount of water should be sufficient to dilute the mixture enough so that the particles of the cementitious material generally should not agglomerate and bind to each other, i.e. they remain discrete. For all practical purposes, the only limits to the amount of water that should be added are those limits determined by logistical concerns. For example, the particles of the cementitious material should not be allowed to settle, therefore, although very large amounts of water may keep the particles from agglomerating they may also require very vigorous agitation or large amounts of suspension aids to keep the particles from settling. For all systems therefore, the minimum amount of water is the amount necessary to keep the particles from agglomerating, and the maximum amount of water is the largest amount where there is still a practical way to keep the particles from settling. After the water has been added to the cementitious material the passivation process will commence. The mixture may need to react for a period, for example, of about 4 hours to about 12 hours. During the reaction phase, the mixture may need to be stirred either continuously or intermittently. Any type of stirring or agitation may be used provided it is sufficient to keep the cement particles from settling (e.g., magnetic stirrers and overhead stirrers may be used.) Additionally, a suspension agent, as discussed above, may be used to aid in suspending the cement particles. Use of the suspending agent may be in addition to or in substitution of agitation. Examples of suitable suspending aids may include viscosifiers, such as those described above which include swellable clays such as bentonite or biopolymers such as cellulose derivatives (e.g., hydroxyethyl cellulose, carboxymethyl cellulose, carboxymethyl hydroxyethyl cellulose). An example of a commercially available viscosifier is SA-1015™ available from Halliburton Energy Services, Inc., Houston, TX.

The passivated cement accelerator should generally be passivated such that the hydraulic activity of the passivated particles has been reduced. For example, the mixture of the passivated cement accelerator and water may generally not set to form a hardened mass for an extended period of time even without the presence of a set retarder. In some embodiments, the mixture of the passivated cement accelerator and water may remain in a pumpable fluid state (i.e. consistency less than 70 Bc as discussed above) for an extended period of time. For example, the mixture of the passivated cement accelerator and water may remain in a pumpable fluid state in a range of about 1 day to about 10 days or longer. Specifically, the mixture of the passivated cement accelerator and water may remain in a pumpable state for about 1 day, about 3 days, about 7 days, about 10 days, or longer. In some embodiments, this mixture may be added to a cement composition as a liquid additive. Alternatively, the water may be removed from the passivated cement accelerator in any sufficient manner (e.g., filtering, drying, suctioning, etc.) and the passivated cement accelerator may be kept as a dry powder and stored for later use. The dry passivated cement accelerator may be stored for weeks or months before use, for example, the dry passivated cement accelerator may be stored for about 4 months or longer.

In embodiments, the passivated cement accelerator may be added to the cement compositions in an amount in a range of about 0.1% to about 10% by weight of the cement in the cement composition. In specific embodiments, the passivated cement accelerator may be present in an amount ranging between any of and/or including any of about 0.1%, about 0.5%, about 1%, about 2%, about 3%, about 5%, about 7%, or about 10% by weight of the cement in the cement composition. One of ordinary skill in the art, with the benefit of this disclosure, will recognize the appropriate amount of passivated cement accelerator to include for a chosen application.

In embodiments the passivated cement accelerator may be used to increase early strength development in a cement composition. It is to be understood that the passivated cement accelerator need not, but may, comprise the same or similar type of cement that is the object of the strength enhancement provided by the passivated cement accelerator. For example, a passivated cement accelerator comprising passivated Portland cement may be added to a cement composition comprising pumice, hydrated lime, and water. In particular embodiments, the cement composition may be a set-delayed cement composition, as discussed in more detail above. As a further example, a passivated slag cement accelerator may be added to a cement composition comprising high alumina content cement.

In some embodiments, the cement compositions may set to have a desirable compressive strength after addition of the passivated cement accelerator. Compressive strength is generally the capacity of a material or structure to withstand axially directed pushing forces. The compressive strength may be measured at a specified time after passivated cement accelerator has been added to the cement composition and the resultant composition is maintained under specified temperature and pressure conditions. Compressive strength can be measured by either destructive or non-destructive methods. The destructive method physically tests the strength of cement composition samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, TX. Compressive strength values may be determined in accordance with API RP 10B-2, *Recommended Practice for Testing Well Cements*, First Edition, July 2005.

By way of example, the cement compositions may develop a 24-hour compressive strength in the range of from about 50 psi to about 5000 psi, alternatively, from about 100 psi to about 4500 psi, or alternatively from about 500 psi to about 4000 psi. In some embodiments, the cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from about 40° F. (or lower) to about 500° F. (or higher).

In some embodiments, the cement compositions may have desirable thickening times after addition of a passivated cement accelerator. Thickening time typically refers to the time a fluid, such as a cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

Optional embodiments of the passivated cement accelerator may be used with a cement set activator, such that an additive comprising a passivated cement accelerator and a cement set activator may be added to the cement compositions. In embodiments where a cement set activator is used it may be necessary to stir the mixture of the passivated cement accelerator and cement set activator while keeping the mixture cooled in an ice bath so as to mitigate any temperature increase. Alternatively, a cement set activator may be added directly to the cement composition before, after, or concurrently with a passivated cement accelerator. The term "cement set activator" or "activator," as used herein, refers to an additive that activates a set-delayed and/or retarded cement composition and may also in certain systems accelerate the setting of set-delayed or retarded cement composition. By way of example, embodiments of a set-delayed and/or retarded cement composition may be activated to form a hardened mass in a time period in the range of from about 1 hour to about 12 hours. For example, embodiments of a set-delayed and/or retarded cement composition may set to form a hardened mass in a time period ranging between any of and/or including any of about 1 hour, about 2 hours, about 4 hours, about 6 hours, about 8 hours, about 10 hours, or about 12 hours.

Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

Some embodiments may include a cement set activator comprising a combination of a monovalent salt and a polyphosphate. The monovalent salt and the polyphosphate may be combined prior to addition to the set-delayed cement composition or may be separately added to the set-delayed cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a cement set activator for embodiments of the set-delayed cement compositions disclosed herein. The ratio of the monovalent salt to the polyphosphate may range, for example, from about 5:1 to about 1:25 or from about 1:1 to about 1:10. Embodiments of the cement set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some embodiments, the combination of the monovalent salt and the polyphosphate may be mixed with a dispersant and water to form a liquid additive for activation of a set-delayed and/or retarded cement composition. Examples of suitable dispersants include, without limitation, the previously described dispersants, such as sulfonated-formaldehyde-based dispersants and polycarboxylated ether dispersants. One example of a dispersant is CFR-3™ dispersant available from Halliburton Energy Services, Inc. Examples of suitable polycarboxylated ether dispersants include Liquiment® 514L and 5581F dispersants, available from BASF Corporation, Houston, Texas.

The liquid additive may function as a cement set activator. As discussed above, a cement set activator may also accelerate the setting of the set-delayed and/or retarded cement. The use of a liquid additive to accelerate a set-delayed and/or retarded cement is dependent upon the compositional makeup of the liquid additive as well as the compositional makeup of the set-delayed and/or retarded cement. With the benefit of this disclosure, one of ordinary skill in the art should be able to formulate a liquid additive to activate and/or accelerate a set-delayed and/or retarded cement composition.

The cement set activator may be added to embodiments of a set-delayed cement composition in an amount sufficient to induce the set-delayed and/or retarded cement composition to set into a hardened mass. In certain embodiments, the cement set activator may be added to the set-delayed and/or retarded cement composition in an amount in the range of about 0.1% to about 20% by weight of the cement. In specific embodiments, the cement set activator may be present in an amount ranging between any of and/or including any of about 0.1%, about 1%, about 5%, about 10%, about 15%, or about 20% by weight of the cement. One of ordinary skill in the art, with the benefit of this disclosure, will recognize the appropriate amount of cement set activator to include for a chosen application.

As will be appreciated by those of ordinary skill in the art, embodiments of the cement compositions may be used in a variety of cementing operations such as surface cementing operations (e.g., construction) and subterranean cementing operations (e.g., primary and remedial cementing). As an example, in some embodiments, a cement composition may be provided that comprises water, pumice, hydrated lime, a set retarder, and optionally a dispersant. A passivated cement accelerator may be added to the cement composition. The cement composition comprising the passivated cement accelerator may then be allowed to set. In some embodiments, the cement composition may be introduced into a subterranean formation and allowed to set therein. As used herein, introducing the cement composition into a subterranean formation includes introduction into any portion of the subterranean formation, including, without limitation, into a wellbore drilled into the subterranean formation, into a near wellbore region surrounding the wellbore, or into both.

In some embodiments, a cement composition may be provided that comprises water, pumice, hydrated lime, a set retarder, and optionally a dispersant. The cement composition may be stored, for example, in a vessel or other suitable container. The cement composition may be permitted to remain in storage for a desired time period. For example, the cement composition may remain in storage for a time period of about 1 day or longer. For example, the cement composition may remain in storage for a time period of about 1 day, about 2 days, about 5 days, about 7 days, about 10 days, about 20 days, about 30 days, about 40 days, about 50 days, about 60 days, or longer. In some embodiments, the cement composition may remain in storage for a time period in a range of from about 1 day to about 7 days or longer. Thereafter, the cement composition may be activated, for example, by the addition of cement set activator which may be a component of a passivated cement accelerator or added in conjunction with a passivated cement accelerator. The cement composition may then be introduced into a subterranean formation, and allowed to set therein.

In primary cementing embodiments, for example, embodiments of the cement composition may be introduced into an annular space between a conduit located in a wellbore and the walls of a wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore.

In remedial cementing embodiments, a cement composition may be used, for example, in squeeze-cementing operations or in the placement of cement plugs. By way of example, the cement composition may be placed in a wellbore to plug an opening (e.g., a void or crack) in the formation, in a gravel pack, in the conduit, in the cement sheath, and/or between the cement sheath and the conduit (e.g., a microannulus).

An embodiment may comprise a method of cementing comprising: providing a cement composition comprising cement, water, and a passivated cement accelerator; and allowing the cement composition to set.

An embodiment may comprise a cement composition comprising: a passivated cement accelerator, water, and a cement.

An embodiment may comprise a passivated cementing system for cementing in a wellbore comprising: a passivated cement accelerator, a cement composition comprising cement and water, mixing equipment capable of mixing the passivated cement accelerator and the cement composition, and pumping equipment for delivering the mixed passivated cement accelerator and the cement composition to a wellbore.

Referring now to FIG. 1, preparation of a cement composition (which may be set delayed or non-set delayed) in accordance with example embodiments will now be described. FIG. 1 illustrates a system 2 for preparation of a cement composition and delivery to a wellbore in accordance with certain embodiments. As shown, the cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore. In set-delayed embodiments, a re-circulating mixer and/or a batch mixer may be used to mix the set-delayed cement composition, and a passivated cement accelerator may be added to the mixer as a liquid or a powder prior to pumping the cement composition downhole. The passivated cement accelerator may comprise an activator. Alternatively the activator may be added to the re-circulating mixer and/or a batch mixer before, after, or concurrently with the passivated cement accelerator.

Figure 2:
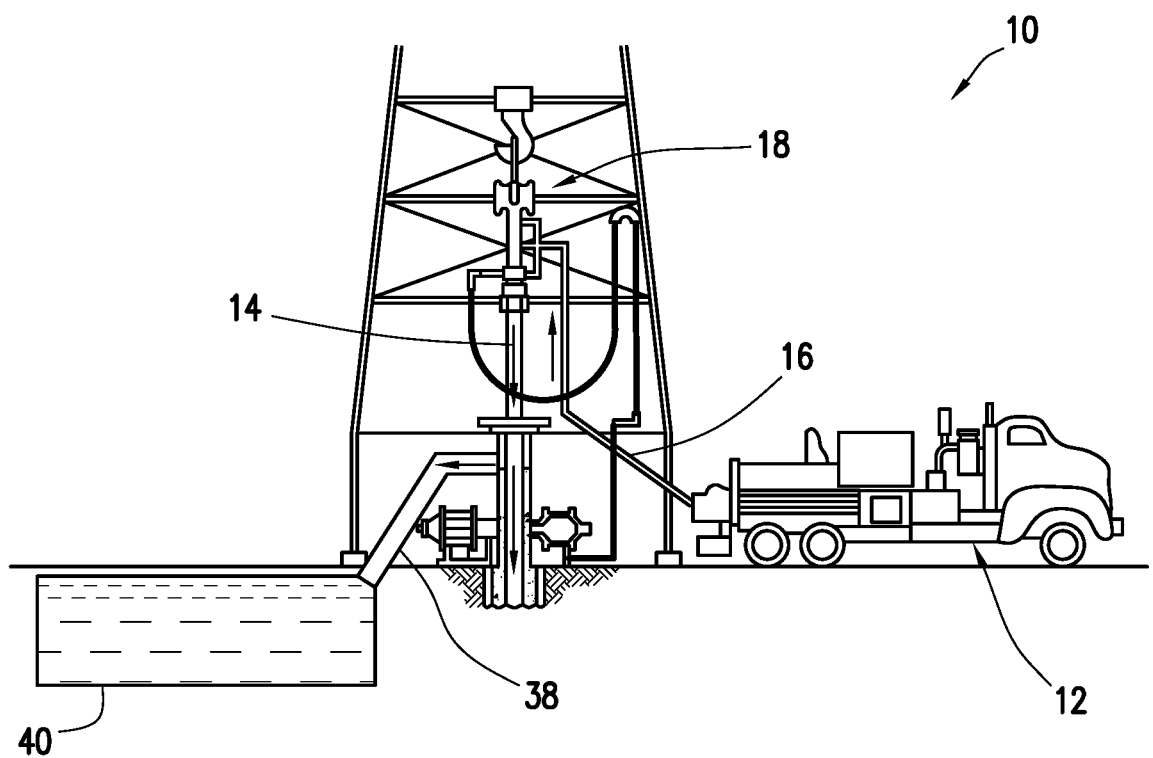
FIG. 2 illustrates surface equipment that may be used in placement of a cement composition in a wellbore in accordance with certain embodiments.

An example technique for placing a cement composition into a subterranean formation will now be described with reference to FIGS. 2 and 3. FIG. 2 illustrates surface equipment 10 that may be used in placement of a cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Turning now to FIG. 2, the set-delayed or non-set-delayed cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

Figure 3:
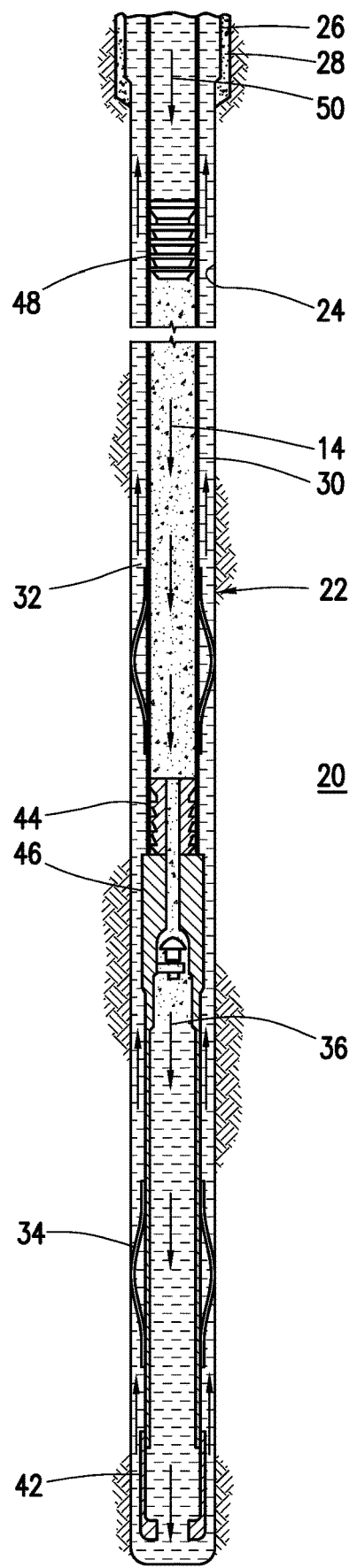
FIG. 3 illustrates placement of a cement composition into a wellbore annulus in accordance with certain embodiments.

With continued reference to FIG. 3, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the pozzolanic cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the pozzolanic cement composition 14 through the bottom plug 44. In FIG. 3, the bottom plug 44 is shown on the landing collar 46. In the illustrated embodiment, a top plug 48 may be introduced into the wellbore 22 behind the cement composition 14. The top plug 48 may separate the cement composition 14 from a displacement fluid 50 and also push the cement composition 14 through the bottom plug 44.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

EXAMPLES

Example 1

The following example describes a passivated cement accelerator and cement set activator composition comprising the following components:

TABLE 2

Passivated Cement Accelerator and Cement Set Activator Compositional Makeup

| Component | Weight (g) | Weight (%) |
|---|---|---|
| Water | 75.0 | 46.4 |
| Cementitious Material | 30.0 | 18.6 |
| Activator | 56.5 | 35.0 |

The passivated cement accelerator was prepared by adding 30.0 grams of Class H Portland cement to 75.0 grams of water. The mixture was allowed to react for 5 hours and was stirred such that the cement particles were sufficiently separated and unable to form a hardened mass. To this mixture, 56.5 grams of $CaCl_2$ were added and stirred into the mixture while cooling it in an ice bath to mitigate the exothermic release caused by the addition of the $CaCl_2$ to the water. In order to demonstrate that the mixture would maintain a pumpable fluid state and would not set into a hardened mass, the mixture was placed in a sealed container on a bench top and a visual inspection was made once per day. After 10 days the mixture was still in a pumpable fluid state.

The passivated cement accelerator comprising a cement set activator was then added to a set-delayed cement composition comprising the following components:

TABLE 3

Set-Delayed Cement Compositional Makeup

| Component | Amount | Unit* |
|---|---|---|
| Water | 60 | % bwoC |
| Pumice | 100 | % bwoC |
| Lime | 20 | % bwoC |

TABLE 3-continued

Set-Delayed Cement Compositional Makeup

| Component | Amount | Unit* |
|---|---|---|
| Weighting Agent | 2 | % bwoC |
| Retarder | 1.25 | % bwoC |
| Co-Retarder | 0.5 | % bwoC |
| Dispersant | 0.6 | % bwoC |
| Viscosifier | 0.035 | % bwoC |

*% bwoC = by weight of cement, for this system the cement is Pumice.

The composition had a density of 13.2 pounds per gallon. The weighting agent was Micromax® FF weight additive available from Halliburton Energy Services, Inc., Houston, TX. The cement retarder was Micro Matrix® Cement Retarder available from Halliburton Energy Services, Inc., Houston, TX. The cement co-retarder was HR®-5 Cement Retarder available from Halliburton Energy Services, Inc., Houston, TX. The dispersant was Liquiment 5581F dispersant available from BASF, Florham Park, New Jersey. The viscosifier was SA-1015™ suspending agent available from Halliburton Energy Services, Inc., Houston, TX. After preparation of the cement composition, an experimental sample of the cement composition was mixed with the passivated cement accelerator and the cement set activator composition. Additionally, a control sample of the cement composition was mixed with only the cement set activator. After mixing, both cement composition samples were further conditioned in an atmospheric conditioner under the following parameters: 70 minutes at 183° F. followed by 60 minutes at 151° F. The samples were then poured into 1" by 2" brass cylinders and cured for 24 hours at 160° F. and 3000 psi. in an autoclave. After the samples were cured, the destructive compressive strength was measured by using a mechanical press to crush the samples in accordance with the procedure set forth in API RP Practice 10B-2, *Recommended Practice for Testing Well Cements*. The results are presented in Table 4 below.

TABLE 4

Compressive Strength Measurements

| Cement Set Activator | Passivated Cement Accelerator | Density (ppg) | Compressive Strength (psi) |
|---|---|---|---|
| 5%* | 2.65%* | 13.2 | 2082 |
| 5%* | — | 13.2 | 95 |

*% by weight of cement, for this system the cement is Pumice.

The results are an average of three experiments. The results show that the addition of a passivated cement accelerator increases the 24 hour compressive strength more than the addition of the cement set activator alone.

Example 2

The following example describes a passivated cement accelerator and a cement set activator composition comprising the following components:

TABLE 5

Passivated Cement Accelerator and Cement Set Activator Compositional Makeup

| Component | Weight (g) | Weight (%) |
|---|---|---|
| Water | 75.0 | 46.4 |
| Cementitious Material | 30.0 | 18.6 |
| Activator | 56.5 | 35.0 |

The passivated cement accelerator was prepared by adding 30.0 grams of ground granulated blast furnace slag to 75.0 grams of water. The mixture was allowed to react for 5 hours and was stirred such that the cement particles were sufficiently separated and unable to form a hardened mass. To this mixture, 56.5 grams of $CaCl_2$ were added and stirred into the mixture while cooling it in an ice bath to mitigate the exothermic release caused by the addition of the $CaCl_2$ to the water. In order to demonstrate that the mixture would maintain a pumpable fluid state and would not set into a hardened mass, the mixture placed in a sealed container on a bench top and a visual inspection was made once per day. After 2 days the mixture was still in a pumpable fluid state.

The passivated cement accelerator comprising a cement set activator was then added to a set-delayed cement composition comprising the following components:

TABLE 6

Set-Delayed Cement Compositional Makeup

| Component | Amount | Unit* |
|---|---|---|
| Water | 60 | % bwoC |
| Pumice | 100 | % bwoC |
| Lime | 20 | % bwoC |
| Weighting Agent | 2 | % bwoC |
| Retarder | 1.25 | % bwoC |
| Co-Retarder | 0.5 | % bwoC |
| Dispersant | 0.6 | % bwoC |
| Viscosifier | 0.035 | % bwoC |

*% bwoC = by weight of cement, for this system the cement is Pumice.

The composition had a density of 13.2 pounds per gallon (ppg). The weighting agent was Micromax® FF weight additive available from Halliburton Energy Services, Inc., Houston, TX. The cement retarder was Micro Matrix® Cement Retarder available from Halliburton Energy Services, Inc., Houston, TX. The cement co-retarder was HR®-5 Cement Retarder available from Halliburton Energy Services, Inc., Houston, TX. The dispersant was Liquiment 5581F dispersant available from BASF, Florham Park, New Jersey. The viscosifier was SA-1015™ suspending agent available from Halliburton Energy Services, Inc., Houston, TX. After preparation of the cement composition, an experimental sample of the cement composition was mixed with the passivated cement accelerator and the cement set activator composition. Additionally, a control sample of the cement composition was mixed with only the cement set activator. After mixing, both cement composition samples were further conditioned in an atmospheric conditioner under the following parameters: 70 minutes at 183° F. followed by 60 minutes at 151° F. The samples were then poured into 1" by 2" brass cylinders and cured for 24 hours at 160° F. and 3000 psi. in an autoclave. After the samples were cured, the destructive compressive strength was measured by using a mechanical press to crush the samples in accordance with the procedure set forth in API RP Practice 10B-2, *Recommended Practice for Testing Well Cements*. The results are presented in Table 7 below.

TABLE 7

Compressive Strength Measurements

| Cement Set Activator | Passivated Cement Accelerator | Density (ppg) | Compressive Strength (psi) |
|---|---|---|---|
| 5%* | 2.65%* | 13.2 | 1324 |
| 5%* | — | 13.2 | 95 |

*% by weight of cementitious materials, for this system the cement is Pumice.

The results are an average of three experiments. The results show that passivating slag for use as a cement accelerator increases the 24-hour compressive strength more than the addition of the cement set activator alone.

Example 3

The following example describes a passivated cement accelerator and a cement set activator composition comprising the following components:

TABLE 8

Passivated Cement Accelerator and Cement Set Activator Compositional Makeup

| Component | Weight (g) | Weight (%) |
|---|---|---|
| Water | 75.0 | 46.4 |
| Cementitious Material | 30.0 | 18.6 |
| Activator | 56.5 | 35.0 |
| Viscosifier | 0.03 | 0.02 |

The passivated cement accelerator was prepared by adding 30.0 grams of Class H Portland cement to 75.0 grams of water and 0.03 grams of the viscosifier, SA-1015™ suspending agent available from Halliburton Energy Services, Inc., Houston, TX The mixture was allowed to react for 5 hours and was stirred such that the cement particles were sufficiently separated and unable to form a hardened mass. To this mixture, 56.5 grams of $CaCl_2$ were added and stirred into the mixture while cooling it in an ice bath to mitigate the exothermic release caused by the addition of the $CaCl_2$ to the water.

The passivated cement accelerator comprising a cement set activator was then added to three different Class H Portland cement compositions comprising the following components:

TABLE 9

Cement Compositional Makeup

| Component* | Sample 1 | Sample 2 | Sample 3 |
|---|---|---|---|
| Water | 38.1 | 37.9 | 37.7 |
| Cement | 100.0 | 100.0 | 100.0 |
| Retarder | 0.0 | 0.5 | 1.0 |

*% by weight of cement, for this system the cement is Class H Portland cement.

Each sample had a density of 16.5 pounds per gallon. The cement retarder was HR®-5 Cement Retarder available from Halliburton Energy Services, Inc., Houston, TX. After preparation of each cement composition, each composition was split into experimental and control samples. The experimental samples of the cement compositions were mixed with the passivated cement accelerator and the cement set activator composition. The control samples of the cement compositions were mixed with only the cement set activator. After mixing, the cement composition samples were then poured into 2″ by 4″ brass cylinders and cured for 24 hours at 80° F. in a water bath. After the samples were cured, the destructive compressive strength was measured by using a mechanical press to crush the samples in accordance with the procedure set forth in API RP Practice 10B-2, *Recommended Practice for Testing Well Cements*. The results are presented in Table 10 below.

TABLE 10

Compressive Strength Measurements

| Composition | Cement Set Activator* | Passivated Cement Accelerator* | Retarder* | Compressive Strength (psi) |
|---|---|---|---|---|
| Sample 1 | 3% | — | 0.0 | 2400 |
| Sample 1 | 3% | 1.6% | 0.0 | 2714 |
| Sample 2 | 3% | — | 0.5 | DNS** |
| Sample 2 | 3% | 1.6% | 0.5 | 3333 |
| Sample 3 | 3% | — | 1.0 | DNS** |
| Sample 3 | 3% | 1.6% | 1.0 | 3229 |

*% by weight of cement, for this system the cement is Class H Portland cement;
**DNS = Did not set.

The results are an average of three experiments. The results show that the addition of passivated cement accelerator increases the 24-hour compressive strength more than the addition of the cement set activator alone.

Example 4

The following example describes a passivated cement accelerator composition comprising the following components:

TABLE 11

Passivated Cement Accelerator Compositional Makeup

| Component | Weight (g) | Weight (%) |
|---|---|---|
| Water | 750.0 | 70.7 |
| Cementitious Material | 300.0 | 28.3 |
| Viscosifier | 10.6 | 1 |

The passivated cement accelerator was prepared by adding 300.0 grams of Class H Portland cement to 750.0 grams of water and 10.6 grams of the viscosifier, SA-1015™ suspending agent available from Halliburton Energy Services, Inc., Houston, TX The mixture was allowed to react for 5 hours and was stirred such that the cement particles were sufficiently separated and unable to form a hardened mass. The passivated cement accelerator was then added to a retarded calcium aluminate phosphate cement:

TABLE 12

Cement Compositional Makeup

| Component* | Weight (g) | % bwoC* |
|---|---|---|
| Water | 311 | 39 |
| Cement | 800 | 100 |
| Retarder | 8 | 1 |
| Co-Retarder | 4 | 0.5 |

*% by weight of cement, for this system the cement is the calcium aluminate phosphate cement.

The cement retarder was FE-2™ Cement Retarder available from Halliburton Energy Services, Inc., Houston, TX. The co-retarder was an organic acid. After preparation of the composition, 1123 grams of the cement composition was added to 39.7 grams of the passivated cement accelerator. The mixture was then stirred in Warring Blender at 4000 rpm for 1 minute.

The rheological properties of the sample were measured using a Model 35A Fann Viscometer and a No. 2 spring with a Fann Yield Stress Adapter (FYSA), in accordance with the procedure set forth in API RP Practice 10B-2, *Recommended Practice for Testing Well Cements*. The results are presented in Table 13 below.

TABLE 13

Rheological Measurements

| Time | RPM | 3 | 6 | 100 | 200 | 300 | 3D | 6D |
|---|---|---|---|---|---|---|---|---|
| 0 Hrs. | ↑ | 3 | 4 | 9 | 15 | 20 | — | — |
| 0 Hrs. | ↓ | 2 | 2 | 7 | 13 | 18 | — | — |
| 0 Hrs. | Avg. | 2.5 | 3 | 8 | 14 | 19 | 1.5 | 1 |
| 2 Hrs. | ↑ | 2 | 3 | 15 | 25 | 35 | — | — |
| 2 Hrs. | ↓ | 2 | 3 | 13 | 17 | 25 | — | — |
| 2 Hrs. | Avg. | 2 | 3 | 14 | 21 | 30 | 1 | 1 |

Introduction of a Portland cement to a calcium aluminate phosphate cement may result in gelation and/or flash setting. However, the results show that the introduction of a passivated Portland cement did not result in gelation or flash setting either immediately to or two hours post mixing.

The composition was then split into experimental and control samples. The experimental sample of the cement composition was mixed with the passivated cement accelerator. The control sample of the cement composition was not mixed with the passivated cement accelerator. The cement composition samples were then poured into 1" by 2" brass cylinders and cured for 72 hours at room temperature. After the samples were cured, the destructive compressive strength was measured by using a mechanical press to crush the samples in accordance with the procedure set forth in API RP Practice 10B-2, *Recommended Practice for Testing Well Cements*. The results are presented in Table 14 below.

TABLE 14

Compressive Strength Measurements

| Composition | Passivated Cement Accelerator* | Compressive Strength (psi) |
|---|---|---|
| Control | 0.0% | DNS** |
| Experimental | 1% | 236.2 |

*% by weight of cement, for this system the cement is the calcium aluminate phosphate cement;
**DNS = Did not set.

The results are an average of three experiments. The results show that the addition of passivated cement accelerator increases the 72-hour compressive strength even without the presence of a cement set activator.

Example 5

The following example describes a passivated cement accelerator composition comprising the following components:

TABLE 15

Passivated Cement Accelerator and Cement Set Activator Compositional Makeup

| Component | Weight (g) | Weight (%) |
|---|---|---|
| Water | 750.0 | 70.7 |
| Cementitious Material | 300.0 | 28.3 |
| Viscosifier | 10.6 | 1 |

The passivated cement accelerator was prepared by adding 300.0 grams of Class H Portland cement to 750.0 grams of water and 10.6 grams of the viscosifier, SA-1015™ suspending agent available from Halliburton Energy Services, Inc., Houston, TX The mixture was allowed to react for 5 hours and was stirred such that the cement particles were sufficiently separated and unable to form a hardened mass. The passivated cement accelerator was then added to a non-retarded calcium aluminate phosphate cement:

TABLE 16

Cement Compositional Makeup

| Component* | Weight (g) | % bwoC* |
|---|---|---|
| Water | 311 | 39 |
| Cement | 800 | 100 |

*% by weight of cement, for this system the cement is the calcium aluminate phosphate cement.

After preparation of the composition, 861 grams of the cement composition was added to 30.4 grams of the passivated cement accelerator. The mixture was then stirred in Warring Blender at 4000 rpm for 1 minute.

The rheological properties of the sample were measured using a Model 35A Fann Viscometer and a No. 2 spring with a Fann Yield Stress Adapter (FYSA), in accordance with the procedure set forth in API RP Practice 10B-2, *Recommended Practice for Testing Well Cements*. The results are presented in Table 17 below.

TABLE 17

Rheological Measurements

| Time | RPM | 3 | 6 | 100 | 200 | 300 | 3D | 6D |
|---|---|---|---|---|---|---|---|---|
| 0 Hrs. | ↑ | 16 | 21 | 30 | 38 | 45 | — | — |
| 0 Hrs. | ↓ | 9 | 9 | 18 | 26 | 35 | — | — |
| 0 Hrs. | Avg. | 12.5 | 15 | 24 | 32 | 40 | 9 | 9 |
| 1 Hrs. | ↑ | 22 | 25 | 37 | 44 | 53 | — | — |
| 1 Hrs. | ↓ | 9 | 9 | 23 | 34 | 48 | — | — |
| 1 Hrs. | Avg. | 15.5 | 17 | 30 | 39 | 50.5 | 9 | 9 |

The passivated cement accelerator did not result in either gelation or a flash set. The mixture was more viscous than the retarded cement composition of Example 4, yet the composition was still fluid and the rheology measurements were largely unchanged even after one hour.

The composition was then split into experimental and control samples. The experimental sample of the cement composition was mixed with the passivated cement accelerator. The control sample of the cement composition was not mixed with the passivated cement accelerator. The cement composition samples were then poured into 1" by 2" brass cylinders and cured for 24 hours in a water bath at 140° F. After the samples were cured, the destructive compressive strength was measured by using a mechanical press to crush the samples in accordance with the procedure set forth in API RP Practice 10B-2, *Recommended Practice for Testing Well Cements*. The results are presented in Table 18 below.

TABLE 18

Compressive Strength Measurements

| Composition | Passivated Cement Accelerator* | Compressive Strength (psi) |
|---|---|---|
| Control | 0.0% | DNS** |
| Experimental | 1% | 244.66 |

*% by weight of cement, for this system the cement is the calcium aluminate phosphate cement;
**DNS = Did not set.

The results are an average of three experiments. The results show that the addition of passivated cement accelerator increases the 24-hour compressive strength even without the presence of a cement set activator.

Example 6

To show that the particles of a cementitious material in a passivated cement accelerator cannot have been passivated, the following experiment was performed. A passivated cement accelerator composition was prepared that comprises the following components:

TABLE 19

Passivated Cement Accelerator Compositional Makeup

| Component | Weight (g) | Weight (%) |
|---|---|---|
| Water | 750.0 | 70.7 |
| Cementitious Material | 300.0 | 28.3 |
| Viscosifier | 10.6 | 1 |

The passivated cement accelerator was prepared by adding 300.0 grams of Class H Portland cement to 750.0 grams of water and 10.6 grams of the viscosifier, SA-1015™ suspending agent available from Halliburton Energy Services, Inc., Houston, TX. The mixture was allowed to react for 5 hours and was stirred such that the cement particles were sufficiently separated and unable to form a hardened mass.

After preparation, the sample was aged for 5 hours and then visually inspected. The sample was observed to be both flowable and pumpable. The rheological properties of the sample were then measured using a Model 35A Fann Viscometer and a No. 2 spring with a Fann Yield Stress Adapter (FYSA), in accordance with the procedure set forth in API RP Practice 10B-2, *Recommended Practice for Testing Well Cements*. The results are presented in Table 20 below.

TABLE 20

5 Hour Rheology Measurements for a Passivated Cement Accelerator

| RPM | 3 | 6 | 100 | 200 | 300 | 600 | $VAV_{100\ rpm}$ (cp)* |
|---|---|---|---|---|---|---|---|
| PCA aged 5 hours | 11<br>9 | 12<br>10 | 20<br>19 | 24<br>24 | 29<br>31 | 41 | 507 |

*$VAV_{100\ rpm}$ = volume average viscosity at 100 rpm in centipoise.

The slurry was then aged for 127 days with intermittent (<3 times a week) agitation (i.e. stirring). After which the slurry was visually inspected and observed to still be both flowable and pumpable. Rheology measurements were taken again using the same protocol and parameters as described above. The results are presented in Table 21 below.

TABLE 21

127 Day Rheology Measurements for a Passivated Cement Accelerator

| RPM | 3 | 6 | 100 | 200 | 300 | 600 | $VAV_{100\ rpm}$ (cp)* |
|---|---|---|---|---|---|---|---|
| PCA aged 127 days | 7<br>4 | 11<br>6 | 33<br>28 | 71<br>63 | 84<br>84 | 98 | 793 |

*$VAV_{100\ rpm}$ = volume average viscosity at 100 rpm in centipoise.

Although there was a slight increase in viscosity after 127 days, the sample did not set into a hardened mass and has been observed to be successfully passivated.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of cementing comprising:
providing a liquid additive comprising a passivated cement accelerator, the passivated cement accelerator comprising particles of a cementitious material and, comprising a passivating layer said passivating layer comprising of a hydration reaction product formed by adding the particles to water that encapsulates the particles of the cementitious material, the passivated cement accelerator being prepared by a process comprising storing the liquid additive in a pumpable fluid state for at least one day;
after storing the liquid additive in a pumpable fluid state for at least one day, combining the liquid additive comprising the passivated cement accelerator with at least a cement and water to prepare a cement composition, wherein the passivated cement accelerator includes the passivating layer when combined with the water, and wherein the passivating layer at least partially dissolves in an alkaline environment formed by the water and the cement;
introducing the cement composition into a subterranean formation; and
allowing the cement composition to set.

2. The method according to claim 1 wherein the cement composition further comprises at least one set retarder selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

3. The method according to claim 1, wherein the cement composition further comprises at least one cement set activator selected from the group consisting of calcium chloride, triethanolamine, sodium silicate, zinc formate, calcium acetate, sodium hydroxide, sodium sulfate, nanosilica, sodium hexametaphosphate, and any combinations thereof.

4. The method according to claim 1, wherein the cement composition further comprises at least one dispersant selected from the group consisting of a sulfonated-formaldehyde-based dispersant, a polycarboxylated ether dispersant, and any combination thereof.

5. The method according to claim 1, wherein the passivated cement accelerator is selected from the group consisting of passivated Portland cement, passivated pozzolana cement, passivated gypsum cement, passivated high alumina content cement, passivated silica cement, passivated slag cement, and any combination thereof.

6. The method according to claim 1, wherein the cement is selected from the group consisting of a Portland cement, a pozzolana cement, a gypsum cement, a high alumina content cement, a silica cement, a slag cement, and any combination thereof.

7. The method according to claim 1, wherein the passivated cement accelerator is provided in a liquid additive further comprising a viscosifier.

8. The method according to claim 1, wherein the passivated cement accelerator comprises passivated Portland cement, wherein the cement comprise pumice, and wherein the cement composition further comprises hydrated lime, a lignosulfonate, and calcium chloride.

9. The method according to claim 1, further comprising preparing the cement composition by mixing a passivated cement accelerator with at least the cement and the water.

10. The method according to claim 1, further comprising preparing the passivated cement accelerator by a process comprising mixing the particles of the cementitious material with water and agitating the mixture of the particles of the cementitious material and additional water such that the passivating layer is formed on at least a portion of the particles of the cementitious material.

11. The method of claim 1, wherein the cement composition further comprises hydrated lime.

12. The method of claim 1, wherein the cement composition further comprises quick lime.

13. The method of claim 1, wherein the cement composition further comprises a calcium salt.

14. The method of claim 1, wherein the cement composition further comprises bentonite.

15. The method of claim 1, wherein the cement composition further comprises hydroxyethyl cellulose.

16. The method of claim 1, wherein the cement composition further comprises carboxymethyl cellulose.

17. The method of claim 1, wherein the cement composition further comprises crystalline silica.

18. The method of claim 1, wherein the cement composition further comprises natural pozzolan.

19. The method of claim 1, wherein the cement composition further comprises resin.

20. The method of claim 1, wherein the cement composition further comprises hydratable clay.

* * * * *